May 1, 1934. J. W. SHAW 1,956,630
DECORATIVE ILLUMINATION
Filed Sept. 18, 1929   3 Sheets-Sheet 3
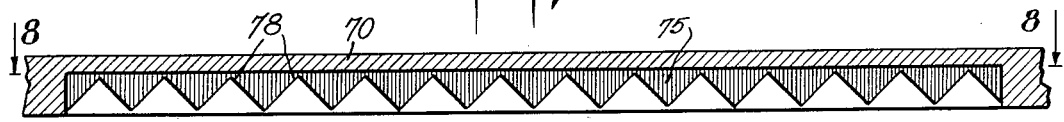
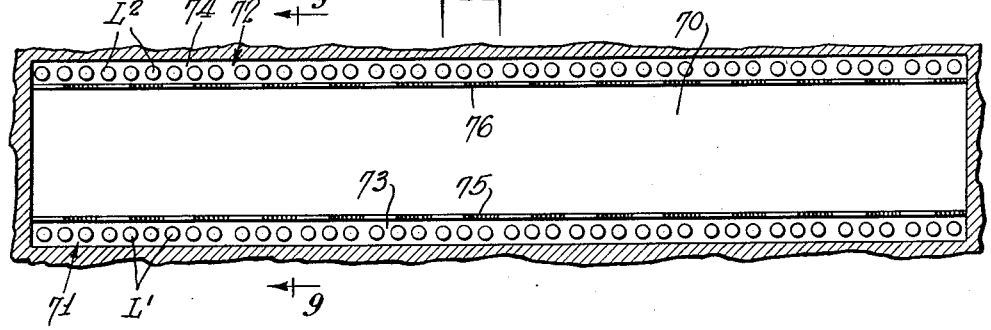
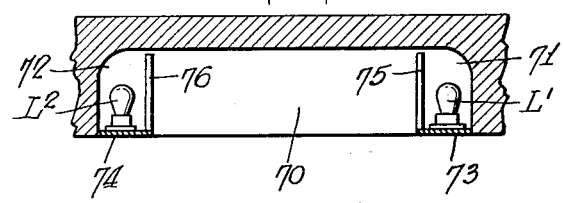
INVENTOR
John W. Shaw
BY
Dean, Fairbank, Obright & Hirsch.
his ATTORNEY Patented May 1, 1934

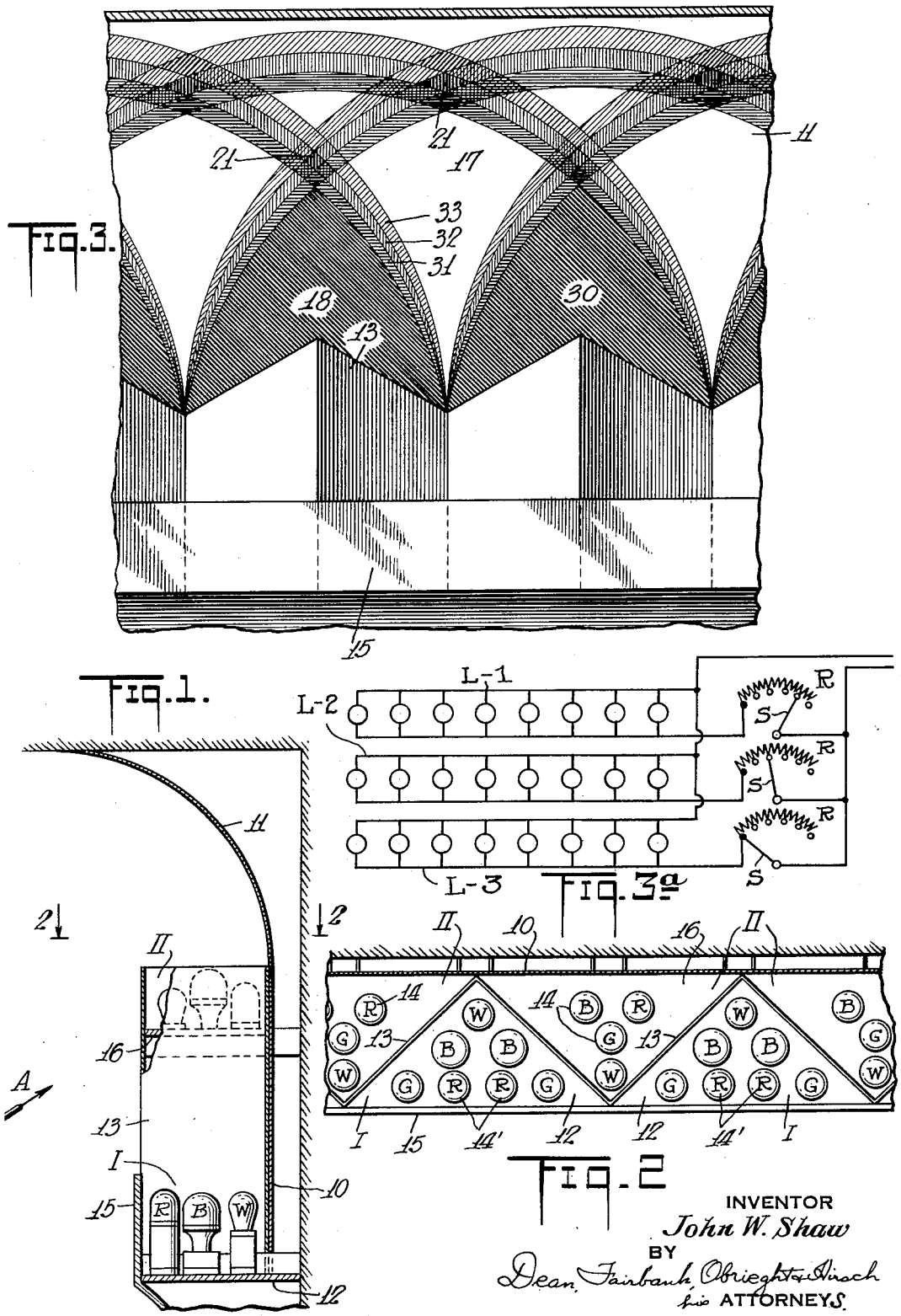

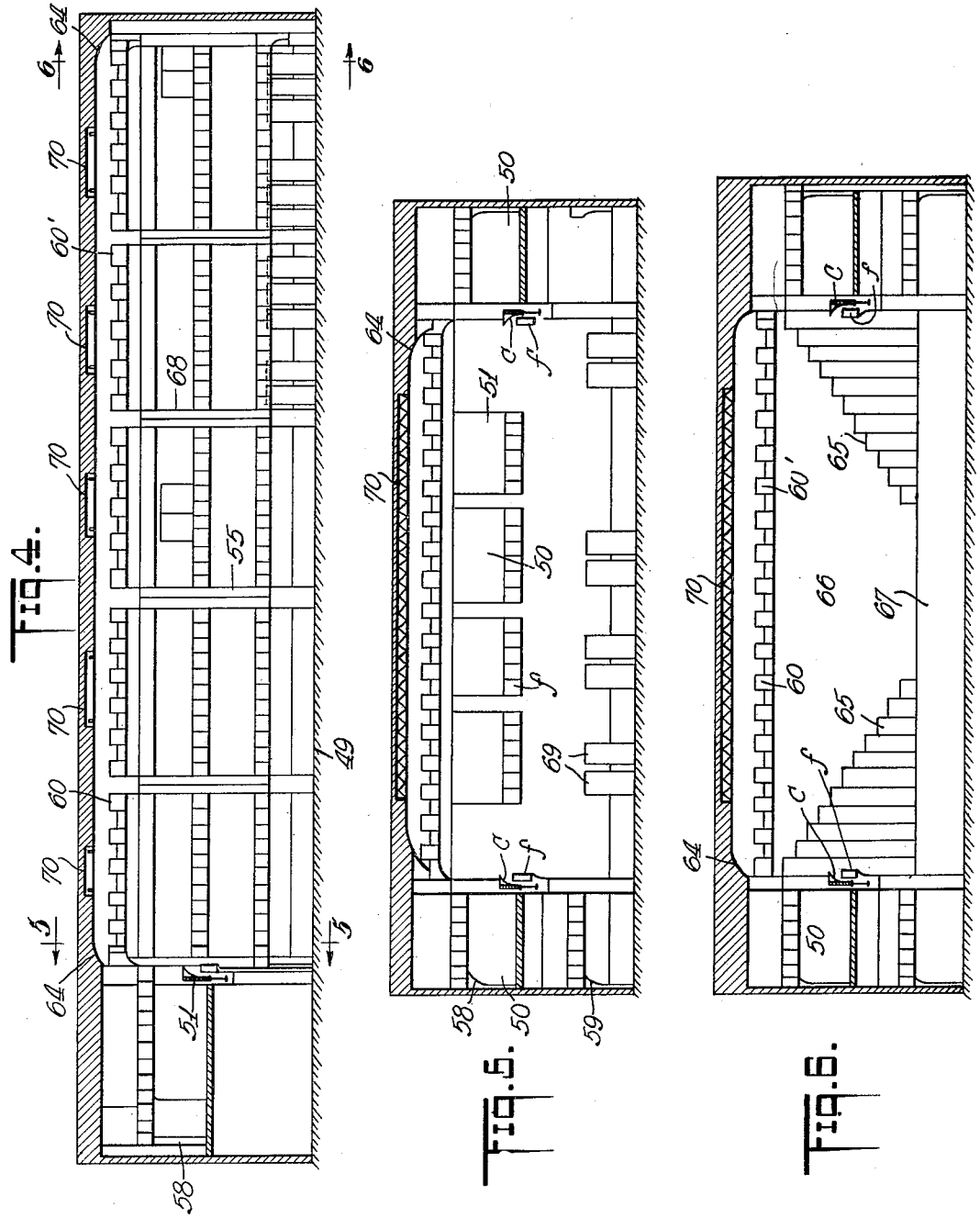

1,956,630

UNITED STATES PATENT OFFICE 1,956,630

DECORATIVE ILLUMINATION

John W. Shaw, Norwood, N. J., assignor to Bing & Bing Inc., a corporation of New York Application September 18, 1929, Serial No. 393,345

8 Claims. (Cl. 240—9)

My present invention is concerned with decorative indirect lighting of particular utility for ball rooms, convention hall, theatres and other auditoriums and is also applicable for exterior regular or festive illumination of buildings.

An object of the invention is to produce indirect lighting effects of striking beauty and infinite variety by the use of simple expedients readily installed without reorganization in the architecture of the structure to be illuminated.

Another object is to provide an installation of the above type which may be readily adapted for peculiar symbolic effects adapted to the particular function or occasion of use.

Another object is to accomplish beautiful compound coloring effects upon a wall, panel, ceiling or the like, by the use of a light without resort to lenses, prisms or compound color screens.

A feature of the invention is the interception of light from a source of illumination in a systemmatic manner to cast decorative areas of light and shade upon the wall, ceiling, coping or other light reflecting screen.

In a specific application, vertical flutings are arranged along the wall below the light reflecting screen, and lamps are mounted in front of the flutings behind concealing screens. Other lamps may be concealed behind the flutings, preferably near the upper parts thereof. In a preferred embodiment the lights in front of the flutings and preferably also those therebehind are in sets of different colors. As a consequence, the front set of lights produce umbral areas of Gothic form with penumbral color strips compounded from the merging lights of different colors to create distinctive pastel effects, while the lights behind the flutings illuminate the darkened areas and enrich the general effect, which may be caused continuously to change by the systematic operation of theatre dimmers controlling and varying the intensity of light from the respective lamps.

In the accompanying drawings in which are shown one or more of various possible embodiments of the several features of the invention, Fig. 1 is a detail vertical sectional view of one unit element of the lighting installation, Fig. 2 is a detail plan view thereof with parts above the line 2—2 of Fig. 1 broken away, Fig. 3 is a detail perspective view of the apparatus on a larger scale taken on the line indicated by the arrow A in Fig. 1, and illustrating the effect produced, Fig. 3a is a purely diagrammatic view showing the dimmer arrangement, Fig. 4 is a longitudinal sectional view of a room equipped with a lighting system in accordance with the present invention, Fig. 5 is a vertical sectional view taken on the line 5—5 of Fig. 4, Fig. 6 is a vertical sectional view taken on the line 6—6 of Fig. 4, Fig. 7 is a detail sectional view showing an application of the invention as applied to ceiling illumination, Fig. 8 is a detail sectional plan view taken on line 8—8 of Fig. 7, and Fig. 9 is a detail transverse sectional view taken on line 9—9 of Fig. 8.

In Figs. 1, 2 and 3 is shown a fragment of installation, which may be reproduced in a recurrent series to suit the desired purpose. Illustratively there is shown a wall 10 provided with a curved coping 11 of the more or less conventional form used as the border of the ceiling of auditoriums, or on balconies or the cornice of buildings among other applications. In front of the wall, below the coping is a base board 12 from which rises an undulatory vertical wall illustratively a fluting composed of flat panels 13 arranged in zig-zag relation and open at their tops alternate edges of the flute panels preferably against the wall 10. Upon the base board and in the alcove 1 formed by contiguous fluting walls are mounted lamps. In the embodiment illustratively shown the lamps in each alcove are seven in number, of which one is shown white, two blue, two red and two green symmetrically arranged and marked respectively W, B, R, and G. Wainscoting 15 extends along the base board against the forward apices of the flutings to conceal the lamps from view.

Preferably additional lamps are provided in the spaces behind the flutings, that is, between the wall 10 and the flutings. Said lamps in each of said rear groups are illustratively four in number, one of each of the colors, blue, red, green and white, marked respectively B, R, G, and W. The mounting platforms 16 for the rear lamps are sufficiently below the upper ends of the flutings to conceal said lamps from view.

The effect of the illumination produced by the installation thus far described is depicted in Fig. 3, and will now be described. The opaque fluting walls 13 which extend well above the lamps of the forward group 1 are illuminated thereby and intercept light projected toward the coping screen. The trace of the shadow from the horizontal upper edge of each fluting wall 13 upon the curved coping 11 is a curved line of demarcation between the area of shade and the area of illumination, or from another point of view, the illuminated area is V or dart shaped as at 17 with curved sides flanked by areas of shade. The areas illuminated from the lamps at contiguous flutings merge as shown, to produce an umbral area 18 in the embodiment shown of distinctive arched, vaulted or Gothic effect. This effect without further embellishment would be produced even with but a single lamp in each alcove in front of the fluting and even though no lamps were disposed behind the respective flutings, and it will be understood that the invention in its broader aspects embraces this simple elementary embodiment.

In the preferred embodiment shown, however, the differing positions of the lamps of different color in the alcove 1, with respect to the upper edges of the flutings, cause the corresponding shadows to be projected in slightly displaced relation with respect to each other as indicated in Fig. 3. Thus, the border of the shaded area due to the blue lamp for instance will be illuminated by rays from the green lamp and the border of the shaded area from each of the latter will be illuminated by the red lamp. The consequence is that penumbral areas 31, 32, 33 due to light of correspond color intervene between the arched shaded area 18 and the dart-shaped illuminated area 17 with a resultant particularly rich pastel color effect. The penumbral pastel strips as shown produce a curved fan shaped effect, and each pair of generally parallel strips emerging from the left of contiguous panels intersects the corresponding pair from the right with the resultant compound vaulting effect shown. The area of intersection between penumbral strips produce the effect of darkened mosaic inlet 21 which adds to the beauty of the effect. The lights to the rear of the flutings illuminate chiefly the umbral area 18 and further spread their light on the rest of the wall and enrich the effect.

By continual changing of colors with the use of a theatre dimmer d alternately dimming the lamps of one color and brightening those of one or more of the others continual variations of color effect are produced. Preferably separate theatre dimmers control the lamps of the two groups and these are operated preferably out of phase relation with each other, whereby infinite variety of illuminating effects may be produced, in which the same instantaneous color effect may not be reproduced until after hours of operation. In the view of Fig. 3a is shown in a purely diagrammatic manner, a theatre dimmer including a plurality of resistance controls R, with switch arms S connected respectively to banks of lights L1, L2 and L3 controlled thereby.

It will be understood that the particular shape of fluting is only illustrative and that the latter may be curved in various designs or that the elements of successive flutings may be spaced with relation to each other. The term "undulatory" as applied to the effect due to the arrangement of flutings is used as generic to all these possible conformations. It will also be understood that the upper edges of respective flutings may be inclined or made of angular or curved shape according to any plan suiting the fancy of the designer, to produce various interesting and beautiful effects, which are all within the scope of the invention claimed herein.

While the flutings are shown opaque it is apparent that they may be of translucent material of any color to transmit light of one color upon what would otherwise be the shaded areas 18 and to reflect light of another color. If desired, various arrangements or selections of color or compound translucent and opaque effects may be employed at the flutings. It is of course obvious that the flutings may be formed in the original plaster or masonry work of the room or building wall respectively, instead of being added to the completed room or building as flashing illustratively shown on the drawings.

By specialized formation of the upper edges of the various flutings or of some of these the shaded areas 18 may be given any form desired, such as that of a cross, a wheel, an animal or the like, for effects adapted to the particular group, organization or occasion for which the decorative lighting is intended. In practice, it is understood that the characteristic designs might be produced by templates releasably affixed at the respective upper edges of the fluting walls.

The coping is shown curved but ornamental effects of corresponding character may be produced at copings of different shape. Instead of using the coping or other part of the room or building as the light reflecting screen as described, it will be understood that special permanent or temporary screens may be employed to produce special or unique effects.

In Figs. 4, 5 and 6 is shown a special application of the invention to the illumination of a grand ball room, which is shown of more or less conventional form, embodying a floor 49, a course of balconies 50 at the sides and at one end and a stage or dais 66 at the opposite end. In this embodiment, as illustratively shown, a set of vertical fluting units f are disposed immediately below the balcony coping c according to the embodiment of Figs. 1 to 3 in front of the balconies, thereby to produce the effects previously described.

Thus arranged, the lighting apparatus, when illuminated, will, in addition to projecting light into the room to illuminate the same, also form an ornamental border extending around three sides of the room.

In certain types of buildings, the balcony sections may be separated by vertically disposed columns such as 55 in Fig. 4. These may be provided with walls or flutes 69, preferably extending throughout the major portion of the column length. Arranged both in front and to the rear of the flutes 55 there will be light sources preferably of the character heretofore described. The entire length of the column flute will thus be illuminated and capped by a rich compounded illuminating effect thereabove.

At the stage or dais end of the room flutes 65 of different lengths or stepped effect are illustratively shown. Lamps concealed behind wainscoting 67 may be disposed as previously described, the colored lights being projected upward from the stepped flutes along the flat wall 66. Other lamps (not shown) may be disposed behind the flute near the upper ends thereof as previously described.

Similar lighting arrangements 58 are diagrammatically indicated at the rear walls of the various balconies and other similar arrangement 59 in the halls below the balconies. Further such units may be disposed along the expanse of the walls of the ball room and at the floor thereof as at 69 for instance. The arrangement is merely illustrative and diagrammatic and may within the scope of the invention be carried out with infinite variety of detail.

The ceiling is shown with a curved periphery 64 which will serve as a border light reflecting screen deriving its illumination from lamps (not shown) behind a series of flutings 60 about the upper edges of the walls.

In the embodiment shown, there is also illustrated a special illuminating effect for the area of the ceiling and embodying generically the principles of this invention. In this embodiment the ceiling is shown with a plurality of rectangular countersunk panels 70. These may be illuminated by the specific arrangement shown in detail in Figs. 7, 8 and 9. The countersunk panels have lateral compartments 71 and 72 extending longitudinally thereof, each of said compartments having a series of lamps L' and L² of diverse colors arranged preferably in cyclic order and mounted respectively upon base boards 73 and 74 constituting part of the main expanse of ceiling. Longitudinally of each side of the panel are preferably disposed scalloped screens 75, 76 respectively which will intercept some of the light from the lamps and thereby produce patterns of light and shade formed by narrow intersecting ribbons of light transversely across the panel. Preferably the distance between successive lamps differs from the width of the scallops 78 and is not an aliquot part of such width. The result is that the merging ribbons of contrasting color do not produce any repeated designs but rather a rainbow effect of a continual change in color from end to end of the panel. By arranging the lights symmetrically with respect to the scallops, on the other hand recurring or cyclically repeated strip of illuminations will result.

Obviously the panel lighting effect last described may be applied to the illumination of a wall panel, a floor panel or other surfaces.

The term "primary colors" as used in certain of the claims is not intended in any strict optical sense, but refers rather to the lights or lamps being the primary sources of illumination from which various color blending effects are produced.

The application of the invention to outdoor illumination of the extension of a building, and especially at a cornice or frieze or balcony and along columns, pilasters or the like will be obvious to those skilled in the art in view of the foregoing.

It will thus be seen that there are herein described, an illuminating installation and method in which the several features of this invention are embodied, and by which the various objects of the invention are accomplished.

As many changes could be made in the above installation and method and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. An indirect lighting system including fluting conformations, a wall portion extending at an angle and in spaced relation with respect to the free edges of the flutings, a plurality of concealed lights disposed in front of each of the flutings and symmetrically arranged with respect thereto, to cast upon the light reflecting screen, ornamental areas of illumination and umbral and penumbral areas due to said flutings.

2. An indirect lighting system including fluting conformations, a wall portion extending at an angle and in spaced relation with respect to the free edges of the flutings, concealed lights disposed in front of the flutings and symmetrically arranged with respect thereto, lamps of various colors symmetrically arranged in front of the various flutings at the parts thereof remote from the wall, whereby the flutings will be illuminated and ornamental areas of light and shade bounded by penumbral strips of compound color will be reflected from the wall.

3. An indirect lighting installation for a wall having a coping determining a light reflecting screen, said installation comprising a series of vertical flutings below said coping and open at their tops, a group of symmetrically disposed lamps of divers colors mounted at the lower ends of each of said flutings and a screen concealing said lamps from view.

4. The method of decorative indirect lighting, which consists in projecting light from a succession of lamps toward a reflecting screen, intercepting light from said various lamps to determine ornamental light and shade patterns upon the reflecting screen, projecting contrasting illumination upon said light and shadow patterns, and systematically varying the color of illumination from said succession of lamps.

5. The method of decorative indirect lighting, which consists in projecting the light from a succession of lamps toward a reflecting screen, intercepting light from said various light sources to determine ornamental light and shadow patterns upon the reflecting screen, projecting contrasting illumination upon said light and shadow areas, and systematically varying the color of light from said two sources of illumination simultaneously and in contrasting manner.

6. An indirect illuminating installation comprising a plurality of sources of light of different colors, a fixed screen to be decoratively illuminated and substantially opaque intercepting means interposed between said lights and said screen and symmetrically arranged with respect to the lights of each color, to reflect light compounded of said different colors and otherwise projected upon certain parts of said screen.

7. The method of wall decoration by colored light which consists in projecting light from a sequence of sources of primary colors, simultaneously toward the wall, while intercepting all of the light from said sources beyond a definite limiting line, resulting in an ornamental compound color penumbral border on said wall immediately beyond said limiting line and reflecting the intercepted light for further decorative effect.

8. The method of wall decoration by colored light which consists in projecting light from a sequence of sources of primary colors simultaneously toward the wall while shielding the wall from the impingement of light thereon from said sources beyond a definite limiting line, resulting in an ornamental compound color penumbral border on said wall immediately beyond said limiting line, and simultaneously projecting light of contrasting colors upon the wall from the shielded area.

JOHN W. SHAW.